United States Patent [19]

Hao

[11] Patent Number: 5,847,791
[45] Date of Patent: Dec. 8, 1998

[54] REFLECTIVE LIQUID CRYSTAL DISPLAY HAVING A DISPERSIVE COLOR FILTER

[75] Inventor: Chia Wei Hao, Taipei, Taiwan

[73] Assignee: Industrial Technology Research Institute, Hsinchu, Taiwan

[21] Appl. No.: 831,844

[22] Filed: Apr. 1, 1997

[51] Int. Cl.$^6$ .......................... G02F 1/1335; C09K 19/60
[52] U.S. Cl. ........................................... 349/106; 349/165
[58] Field of Search ..................................... 349/106, 165, 349/166

[56] References Cited

U.S. PATENT DOCUMENTS

| | | |
|---|---|---|
| 5,232,634 | 8/1993 | Sawada et al. ........................ 252/584 |
| 5,452,113 | 9/1995 | Ikeno ....................................... 349/106 |
| 5,629,783 | 5/1997 | Kanbara et al. ......................... 349/116 |
| 5,734,457 | 3/1998 | Mitsui et al. ............................ 349/106 |

*Primary Examiner*—William L. Sikes
*Assistant Examiner*—Tiep H. Nguyen

[57] ABSTRACT

A reflective color liquid crystal comprising a guest-host liquid crystal display, a color filter and a reflector. The reflector is a simple mirror-like reflection surface. The color filter is manufactured with a pigment dispersion method. The particle size of the pigment is reduced to provide strong light forward scattering and weak light back scattering. The color filter provides light colors for the display as well as light scattering to increase the viewing angle for the display.

16 Claims, 4 Drawing Sheets

REFLECTIVE LIQUID CRYSTAL DISPLAY HAVING A DISPERSIVE COLOR FILTER

FIELD OF THE INVENTION

The present invention relates to a reflective color liquid crystal display device, and more specifically to the color filter and the reflector of a guest-host liquid crystal display.

BACKGROUND OF THE INVENTION

The advance in personal computer and network technologies of recent years has brought a lot of interests in personal information devices such as electronic organizers and personal digital assistants. All these digital apparatus require a high resolution and good quality device for facilitating the user interface and displaying the information. A color liquid crystal display is most suitable for manufacturing the display device because of its small size and light weight. A reflective color liquid crystal display is even more attractive in that its operation does not need back-light and consumes relatively low power.

A color filter is frequently used in the manufacture of a color liquid crystal display because of its excellent full-color capability. A category of color liquid crystal displays widely available in the market uses twisted nematic (TN) or super twisted nematic (STN) liquid crystal associated with a color filter. The color filter in this conventional type of liquid crystal display has frequently been fabricated by a pigment dispersion method because excellent filter quality, accuracy and reliability can be achieved.

When pigments are dispersed to give necessary optical characteristics of a liquid crystal display, transmittance loss due to light scattering of the pigment is inevitable. In addition, it is important to avoid light scattering in the conventional TN or STN liquid crystal display because both polarization and phase are affected by the scattering. In order to minimize the transmittance loss, pigments are reduced to fine particles and dispersed to satisfy the spectral characteristics required for color filters. Typically, the particle size of the pigment is reduced to an average of 0.05 to 0.1 $\mu$m which is substantially smaller than the light wavelength to minimize light scattering.

A guest-host liquid crystal display (GH-LCD) device is another type of liquid crystal display manufactured by adding a dichroic dye to a chiral-nematic liquid crystal material that absorbs or passes light dependent on the orientation of the dye. In the off-state of the device, the liquid crystal is in parallel with the glass substrate of the display device. Light travels vertically to the orientation of the liquid crystal and is absorbed by the dye adhered to the liquid crystal. In the on-state of the device, the liquid crystal is oriented vertically to the glass substrate because of the applied voltage. Therefore, light travels in parallel with the liquid crystal as well as the dye and is not absorbed.

The GH-LCD device gives excellent brightness because the light-absorption polarizer commonly used in a TN liquid crystal device is eliminated. Therefore, it is also more appropriate for manufacturing a reflective color liquid crystal device. FIG. 1 shows a conventional reflective color liquid crystal display device having a GH-LCD. The GH-LCD 101 is sandwiched between a color filter 102 and a reflector 103. Because of the elimination of polarizers, it is possible to expect that 50% of the light can be reflected. In order to increase the viewing angle of the display, the reflector 103 is often manufactured with a rough diffusion surface to scatter the reflected light in all directions.

In the fabrication of such a conventional reflective color GH-LCD device, the color filter and the reflector represent two components that are expensive and difficult to manufacture. The pigment used for the color filter has to be reduced into very fine particles. Additive may also have to be added to prevent the fine particles from merging together again. However, the additive may introduce some undesirable side-effect in manufacturing the display. The formation of the rough diffusion surface on the reflector also increases the complexity and cost of making the device.

The prior art that describes the manufacturing of color filters can be found in "Colour Filters for LCDS" authored by K. Tsuda in vol. 14, No. 2, pp. 115–124, 1993 of Displays published by Butterworth-Heinemann Ltd. A description of late development in low power color LCDs can be found in "Trend in the Development of Low Power Color LCDs for Personal Information Tools" authored by Y. Ishii et al. in pp. 115–118 of Euro Display '96.

SUMMARY OF THE INVENTION

The present invention has been made to overcome the above-mentioned drawback, to simply the procedures and to reduce the cost of manufacturing a reflective color liquid crystal display. The primary object of this invention is to provide new structures for the color filter and the reflector of a reflective color liquid crystal display. Another object of this invention is to provide a low cost and high quality reflective color liquid crystal display.

In the present invention, a guest-host liquid crystal is used for the reflective color liquid crystal display. The color filter is manufactured with a pigment method. Instead of reducing the particle size of the pigment to be substantially smaller than the wavelength of the light, the particle size is maintained at near or slightly larger than the wavelength. By using a larger particle size, the pigment results in a certain amount of scattering without significant transmittance loss while light travels through the GH-LCD.

A simple reflector with mirror-like surface is used for the reflective color liquid crystal display. According to this invention, the requirement of a rough diffusion surface is eliminated because of the scattering effect introduced by the pigment particles in the color filter. In other words, the color filter of the present invention also serve as the scattering source of a diffuser of the display device for increasing the viewing angle and avoid specular reflection.

DETAILED DESCRIPTION OF THE PREFERRED EMBODIMENTS

Figure 1:
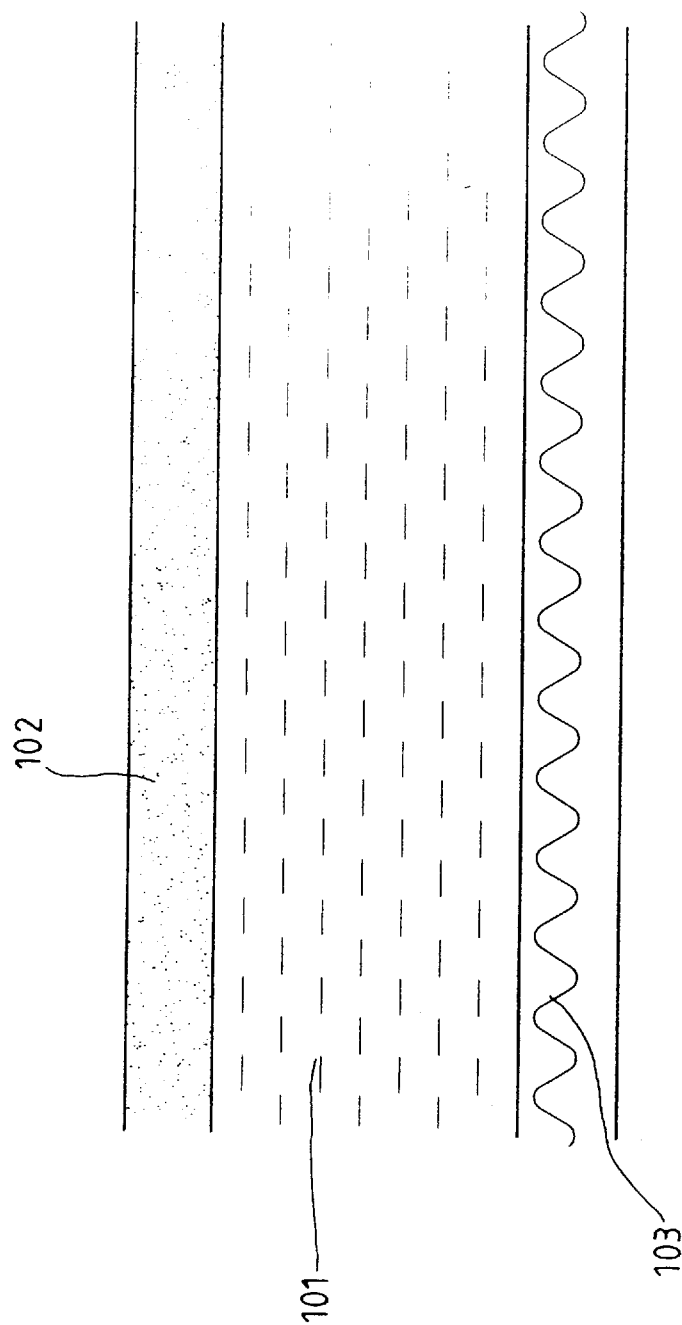
FIG. 1 shows a conventional reflective color liquid crystal display.
Figure 2:
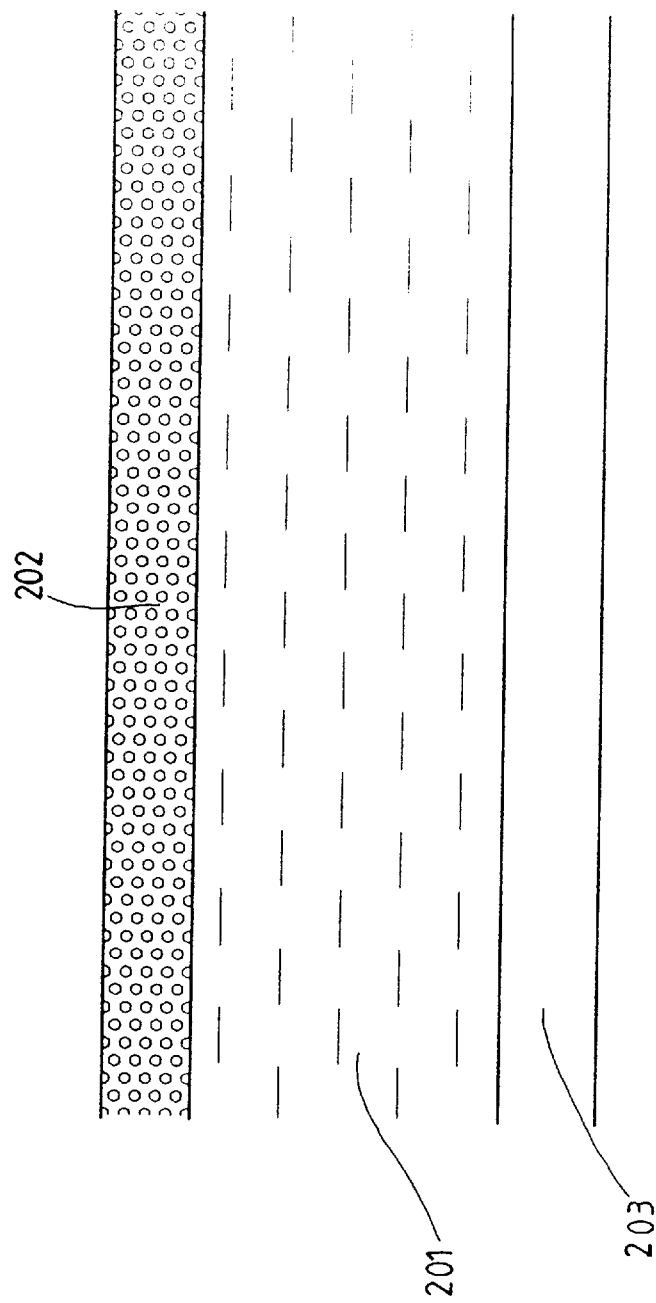
FIG. 2 shows a preferred embodiment of the reflective color liquid crystal display of this invention.

FIG. 2 shows a preferred embodiment of the reflective color liquid crystal display of the present invention. The color liquid crystal display comprises a guest-host liquid crystal 201, a color filter 202 and a reflector 203. A dichroic dye is added to a chiral-nematic liquid crystal material to get the guest-host liquid crystal layer 201. The reflector 202 comprises a mirror-like reflection surface such as a plane metal surface.

The color filter 202 is manufactured with a pigment dispersion method. The particle size of the pigment is reduced to about 0.5 to 2.0 μm. Pigment particles are dispersed in the color filter to obtain the optical characteristics for providing colors to the liquid crystal display. Because the size of the pigment particles is near or slightly larger than the wavelength of a visible light. When light travels through the color filter, the pigment particle scatters the light. For particle sizes in the range of roughly 0.5 to 2.0 μm, the forward scattered light is substantially stronger than the backward scattered light.

When no electrical voltage is applied, the guest-host liquid crystal is in parallel with the glass substrate of the display device. Light travels vertically to the orientation of the liquid crystal and is absorbed by the dichroic dye adhered to the liquid crystal. In the on-state of the device, the liquid crystal is oriented vertically to the glass substrate because of the applied voltage. Light travels in parallel with the liquid crystal as well as the dye and is not absorbed. Because the light source for the reflective color liquid crystal display is not polarized, 50% of the light can be reflected.

According to this invention, the color filter not only provides colors for the liquid crystal display but also serves as a means to scatter the light for better viewing from wider angles. The manufacturing of the color filter becomes easier because the size of the pigment particle does not have to be reduced to as small as 0.05 to 0.1 μm which is one of the most difficult processes in making the conventional color filter. Reducing the pigment particle size to the range of 0.5 to 2.0 μm can be accomplished without too much difficulty. The cost of manufacturing the color filter is greatly reduced in that many of the requirements in the manufacturing processes are no longer so stringent.

The manufacturing of the reflector 203 is also simplified. A mirror-like reflector can be appropriately used in the color liquid crystal display. The rough diffusion surface that has to be fabricated on a conventional reflector is no longer necessary. The reflector can be a simple plane metal surface. In other words, the tedious process for making the reflection surface rough enough to provide proper scattering is eliminated.

Figure 4:
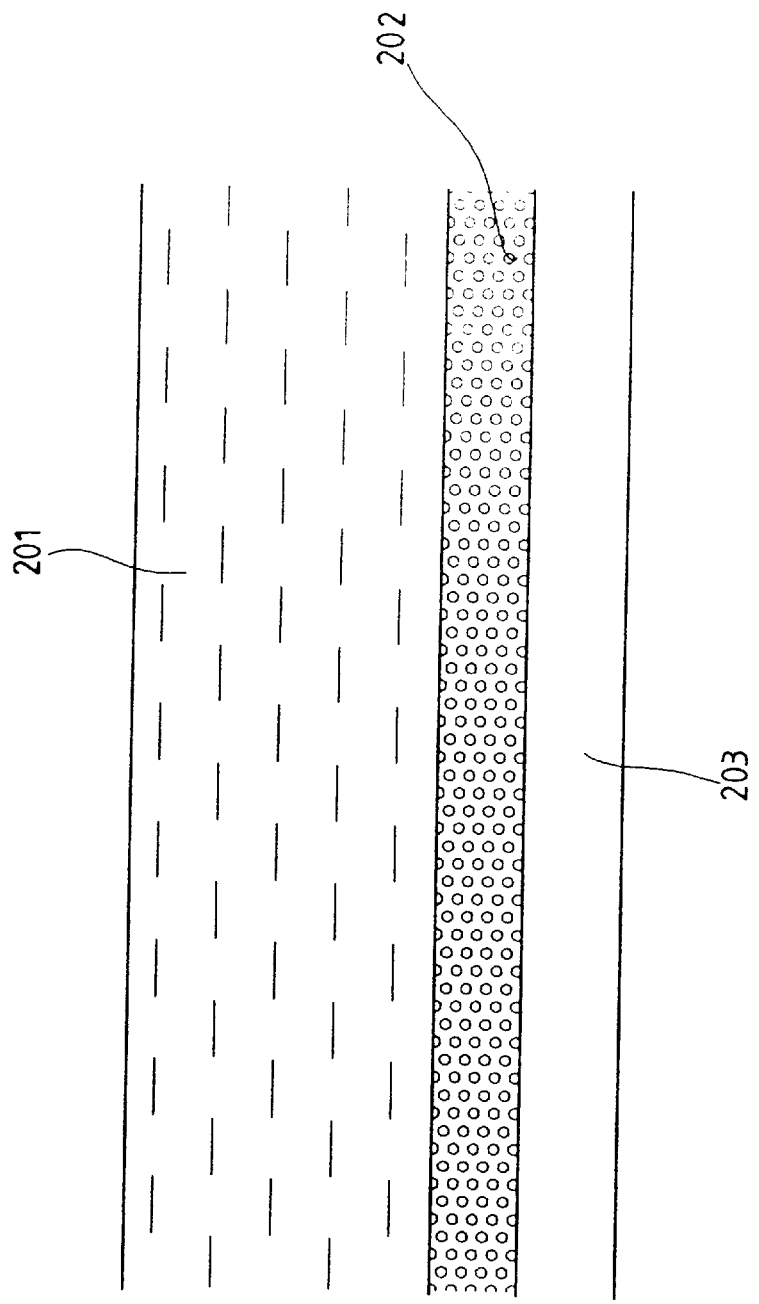
FIG. 4 shows an alternative embodiment of the reflective color liquid crystal display of this invention.

FIG. 4 shows an alternative embodiment of the present invention. In this embodiment, the color filter 202 is sandwiched between the guest-host liquid crystal 201 and the reflector 203. Because a guest-host liquid crystal display relies on the orientation of the die for absorbing or passing the light, polarization and phase change caused by the color filter do not affect its operation. The color filter can therefore be laid between the liquid crystal 201 and the reflector 203.

Figure 3:
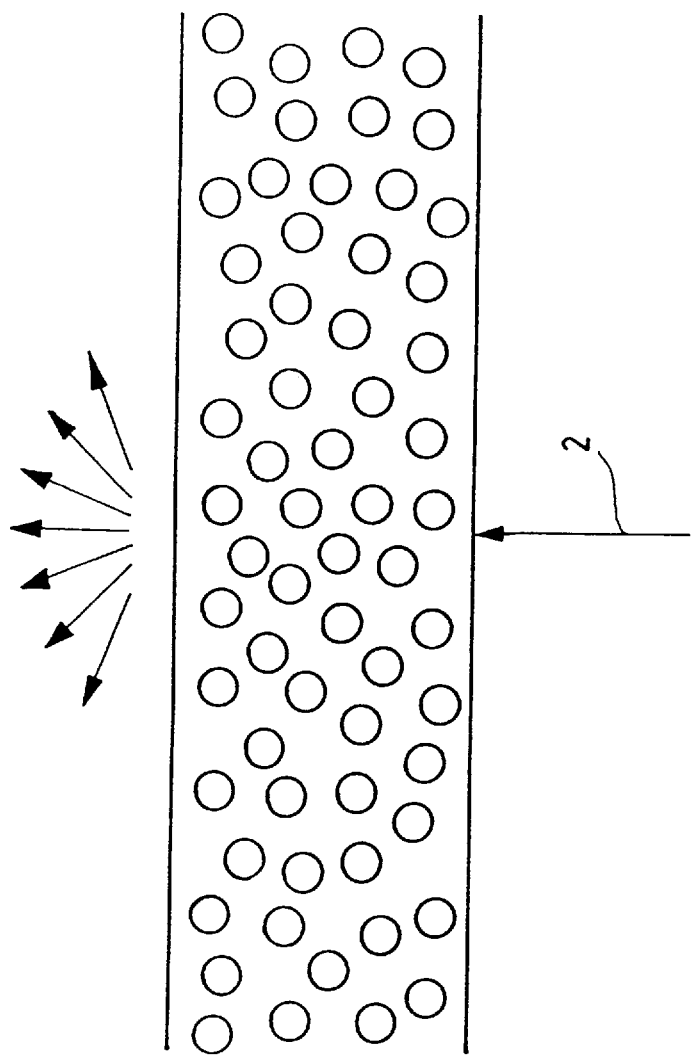
FIG. 3 shows the color filter of the present invention.

The guest-host liquid crystal 201 shown in FIG. 2–4 can also be replaced by a phase change guest-host liquid crystal. The operation of a phase change guest-host liquid crystal is to the contrary of a normal guest-host liquid crystal. When no electrical voltage is applied, the phase change guest-host liquid crystal is oriented vertically to the glass substrate of the display device. Light travels in the direction of the liquid crystal and is transmitted through. Therefore, the display device appears bright. If an electrical voltage is applied, the liquid crystal is oriented in parallel with the glass substrate. Light is absorbed by the dichroic dye adhered to the liquid crystal. The display device appears dark.

While the invention has been particularly shown and described with reference to these preferred embodiments, it will be understood by those skilled in the art that various changes in form and details may be made without departing from the spirit and scope of the invention. Although only the preferred embodiments of this invention were shown and described in the above description, it is requested that any modification or combination that comes within the spirit of this invention be protected.

What is claimed is:

1. A reflective color liquid crystal display comprising:
   a reflector;
   a guest-host liquid crystal display on top of said reflector, said guest-host liquid crystal display having a glass substrate and including a dichroic dye added and adhered to chiral-nematic liquid crystal material on said glass substrate, said chiral-nematic liquid crystal material being oriented in a direction vertical to the surface of said glass substrate and in parallel with light traveling direction when an electric voltage is applied, and oriented in a direction in parallel with the surface of said glass substrate and perpendicular to light traveling direction when no electric voltage is applied;
   and a color filter on top of said guest-host liquid crystal display, said color filter being fabricated by a pigment dispersion method having pigment particle size being reduced to a range from 0.5 μm to 2.0 μm in diameter;
   wherein the dye adhered to the chiral-nematic liquid crystal material passes or absorbs light dependent on whether an electric voltage is applied or not, and said color filter substantially forward scatters light for increasing the viewing angle of said reflective color liquid crystal display.

2. The reflective color liquid crystal display according to claim 1, wherein said pigment particle size is reduced for providing substantially stronger light forward scattering than light back scattering in said color filter.

3. The reflective color liquid crystal display according to claim 1, wherein said reflector having a mirror-like reflection surface.

4. The reflective color liquid crystal display according to claim 1, wherein said reflector is a metal layer having plane surface.

5. A reflective color liquid crystal display comprising:
   a reflector;
   a phase change guest-host liquid crystal display on top of said reflector, said phase change guest-host liquid crystal display having a glass substrate and including a dichroic dye added and adhered to chiral-nematic liquid crystal material on said glass substrate, said chiral-nematic liquid crystal material being oriented in a direction parallel with the surface of said glass substrate and perpendicular to light traveling direction when an electric voltage is applied, and oriented in a direction vertical to the surface of said glass substrate and in parallel with light traveling direction when no electric voltage is applied;
   and a color filter on top of said phase change guest-host liquid crystal display, said color filter being fabricated by a pigment dispersion method having pigment particle size being reduced to a range from 0.5 μm to 2.0 μm in diameter;
   wherein the dye adhered to the chiral-nematic liquid crystal material absorbs or passes light dependent on whether an electric voltage is applied or not, and said color filter substantially forward scatters light for increasing the viewing angle of said reflective color liquid crystal display.

6. The reflective color liquid crystal display according to claim 5, wherein said pigment particle size is reduced for providing substantially stronger light forward scattering than light back scattering in said color filter.

7. The reflective color liquid crystal display according to claim 5, wherein said reflector having a mirror-like reflection surface.

8. The reflective color liquid crystal display according to claim 5, wherein said reflector is a metal layer having plane surface.

9. A reflective color liquid crystal display comprising:

a reflector;

a color filter on top of said reflector, said color filter being fabricated by a pigment dispersion method having pigment particle size being reduced to a range from 0.5 μm to 2.0 μm in diameter; and a guest-host liquid crystal display on top of said color filter, said guest-host liquid crystal display having a glass substrate and including a dichroic dye added and adhered to chiral-nematic liquid crystal material on said glass substrate, said chiral-nematic liquid crystal material being oriented in a direction vertical to the surface of said glass substrate and in parallel with light traveling direction when an electric voltage is applied, and oriented in a direction in parallel with the surface of said glass substrate and perpendicular to light traveling direction when no electric voltage is applied;

wherein the dye adhered to the chiral-nematic liquid crystal material passes or absorbs light dependent on whether an electric voltage is applied or not, and said color filter substantially forward scatters light for increasing the viewing angle of said reflective color liquid crystal display.

10. The reflective color liquid crystal display according to claim 9, wherein said pigment particle size is reduced for providing substantially stronger light forward scattering than light back scattering in said color filter.

11. The reflective color liquid crystal display according to claim 9, wherein said reflector having a mirror-like reflection surface.

12. The reflective color liquid crystal display according to claim 9, wherein said reflector is a metal layer having plane surface.

13. A reflective color liquid crystal display comprising:

a reflector;

a color filter on top of said reflector, said color filter being fabricated by a pigment dispersion method having pigment particle size being reduced to a range from 0.5 μm to 2.0 μm in diameter; and a phase change guest-host liquid crystal display on top of said color filter, said phase change guest-host liquid crystal display having a glass substrate and including a dichroic dye added and adhered to chiral-nematic liquid crystal material on said glass substrate, said chiral-nematic liquid crystal material being oriented in a direction parallel with the surface of said glass substrate and perpendicular to light traveling direction when an electric voltage is applied, and oriented in a direction vertical to the surface of said glass substrate and in parallel with light traveling direction when no electric voltage is applied;

wherein the dye adhered to the chiral-nematic liquid crystal material absorbs or passes light dependent on whether an electric voltage is applied or not, and said color filter substantially forward scatters light for increasing the viewing angle of said reflective color liquid crystal display.

14. The reflective color liquid crystal display according to claim 13, wherein said pigment particle size is reduced for providing substantially stronger light forward scattering than light back scattering in said color filter.

15. The reflective color liquid crystal display according to claim 13, wherein said reflector having a mirror-like reflection surface.

16. The reflective color liquid crystal display according to claim 13, wherein said reflector is a metal layer having plane surface.

* * * * *